US012693667B2

(12) United States Patent
    Iizuka

(10) Patent No.: US 12,693,667 B2
(45) Date of Patent: Jul. 28, 2026

(54) POSITION OBTAINING DEVICE, POSITION OBTAINING METHOD AND STORAGE MEDIUM

(71) Applicant: CASIO COMPUTER CO., LTD., Tokyo (JP)

(72) Inventor: Nobuo Iizuka, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 300 days.

(21) Appl. No.: 18/243,965

(22) Filed: Sep. 8, 2023

(65) Prior Publication Data

US 2024/0103526 A1     Mar. 28, 2024

(30) Foreign Application Priority Data

Sep. 22, 2022     (JP) ................................. 2022-151682

(51) Int. Cl.
    *G05D 1/00*          (2024.01)
    *G06V 20/56*         (2022.01)
(52) U.S. Cl.
    CPC ........... *G05D 1/0246* (2013.01); *G06V 20/56* (2022.01)
(58) Field of Classification Search
    CPC .. G05D 1/0246; G05D 1/247; G05D 2109/10; G05D 1/243; G06V 20/56
    See application file for complete search history.

(56) References Cited

U.S. PATENT DOCUMENTS

| | | | |
|---|---|---|---|
| 2015/0332100 A1* | 11/2015 | Yamaguchi .......... | G06V 10/147 348/142 |
| 2016/0275790 A1* | 9/2016 | Kang ..................... | G06Q 10/10 |
| 2017/0276766 A1* | 9/2017 | Aoyama ................. | G01S 3/781 |
| 2022/0092815 A1* | 3/2022 | Iizuka ........................ | G06T 7/73 |
| 2022/0408629 A1* | 12/2022 | Suzuki ................. | G05D 1/6484 |

FOREIGN PATENT DOCUMENTS

| | | |
|---|---|---|
| JP | 2017-173247 A | 9/2017 |
| JP | 2022-050929 A | 3/2022 |
| WO | 2019/082669 A1 | 5/2019 |
| WO | 2021/157123 A1 | 8/2021 |

* cited by examiner

*Primary Examiner* — Wade Miles
*Assistant Examiner* — Mohammed Yousef Abuelhawa
(74) *Attorney, Agent, or Firm* — Fitch, Even, Tabin & Flannery LLP

(57)                    ABSTRACT

A position obtaining device includes a driver and a processor. The processor, in response to a velocity of the device being moved by the driver being a predetermined velocity or less, derives a first attitude angle with a first likelihood as an attitude angle of the device; in response to a predetermined number of second light sources or more being captured in an image obtained by a second camera, derives a three-dimensional position of the device and a second attitude angle with a second likelihood lower than the first likelihood as the attitude angle of the device; determines a likelihood of the attitude angle and the three-dimensional position of the device estimated based on a result of the first attitude angle and a result of the three-dimensional position and the second attitude angle; and controls the velocity in accordance with the determined likelihood.

18 Claims, 8 Drawing Sheets

VELOCITY (DASH-DOT-DASH LINE)
POSITIONING LIKELIHOOD (SOLID LINE)

POSITION OBTAINING DEVICE, POSITION OBTAINING METHOD AND STORAGE MEDIUM

REFERENCE TO RELATED APPLICATIONS

This application is based upon and claims the benefit of priority from the prior Japanese Patent Application No. 2022-151682, filed on Sep. 22, 2022, the entire contents of which are incorporated herein by reference.

TECHNICAL FIELD

The present disclosure relates to a position obtaining device, a position obtaining method and a storage medium.

DESCRIPTION OF RELATED ART

Various positioning systems have been used to estimate the self-position. For example, there has been proposed a technique of estimating the position of a moving object by imaging, with a camera mounted on the moving object, light emitting devices (position indicators) that transmit IDs capable of uniquely identifying themselves by visible light communication (e.g., patterns of three colors, R, G, B). (See JP 2022-050929 A.) This technique is, to be more specific, a technique of measuring installation positions (three-dimensional positions) of the light emitting devices in advance, detecting, from an image taken by the camera, coordinate positions of the light emitting devices on the image and their IDs, and determining the position of the moving object on the basis of the detected coordinate positions of the light emitting devices on the image and the three-dimensional positions of the light emitting devices.

This positioning using the visible light communication can measure three degrees of freedom (horizontal position and horizontal azimuth) of the moving object, for example, by limiting a space where the moving object moves and the position thereof (self-position) is measured to a plane (plane constraint), fixing the height and two degrees of freedom (pitch and roll) of the attitude angle of the camera, and detecting two position indicators (light sources) in the image taken by the camera (one position indicator if the position indicator can be detected continuously in terms of time).

SUMMARY OF THE INVENTION

According to an aspect of the present disclosure, there is provided a position obtaining device including:
a driver that moves the position obtaining device; and
a processor that
in response to a velocity of the position obtaining device that is being moved by the driver being equal to or less than a predetermined velocity, derives a first attitude angle with a first likelihood as an attitude angle of the position obtaining device,
in response to a predetermined number of second light sources or more being captured in an image obtained by a second camera, derives a three-dimensional position of the position obtaining device and a second attitude angle with a second likelihood lower than the first likelihood as the attitude angle of the position obtaining device,
determines an overall likelihood of the attitude angle and the three-dimensional position of the position obtaining device estimated based on a first derived result of the first attitude angle and a second derived result of the three-dimensional position and the second attitude angle, and
controls the velocity of the position obtaining device, which is being moved by the driver, in accordance with the determined overall likelihood of the attitude angle and the three-dimensional position of the position obtaining device.

BRIEF DESCRIPTION OF DRAWINGS

The accompanying drawings are not intended as a definition of the limits of the present disclosure but illustrate embodiments of the present disclosure, and together with the general description given above and the detailed description of embodiments given below, serve to explain the principles of the present disclosure, wherein.

DETAILED DESCRIPTION

Hereinafter, one or more embodiments of a position obtaining device according to the present disclosure will be described with reference to the drawings. The present disclosure is not limited to the embodiments or illustrated examples.

[Configuration of Positioning System]

Figure 1:
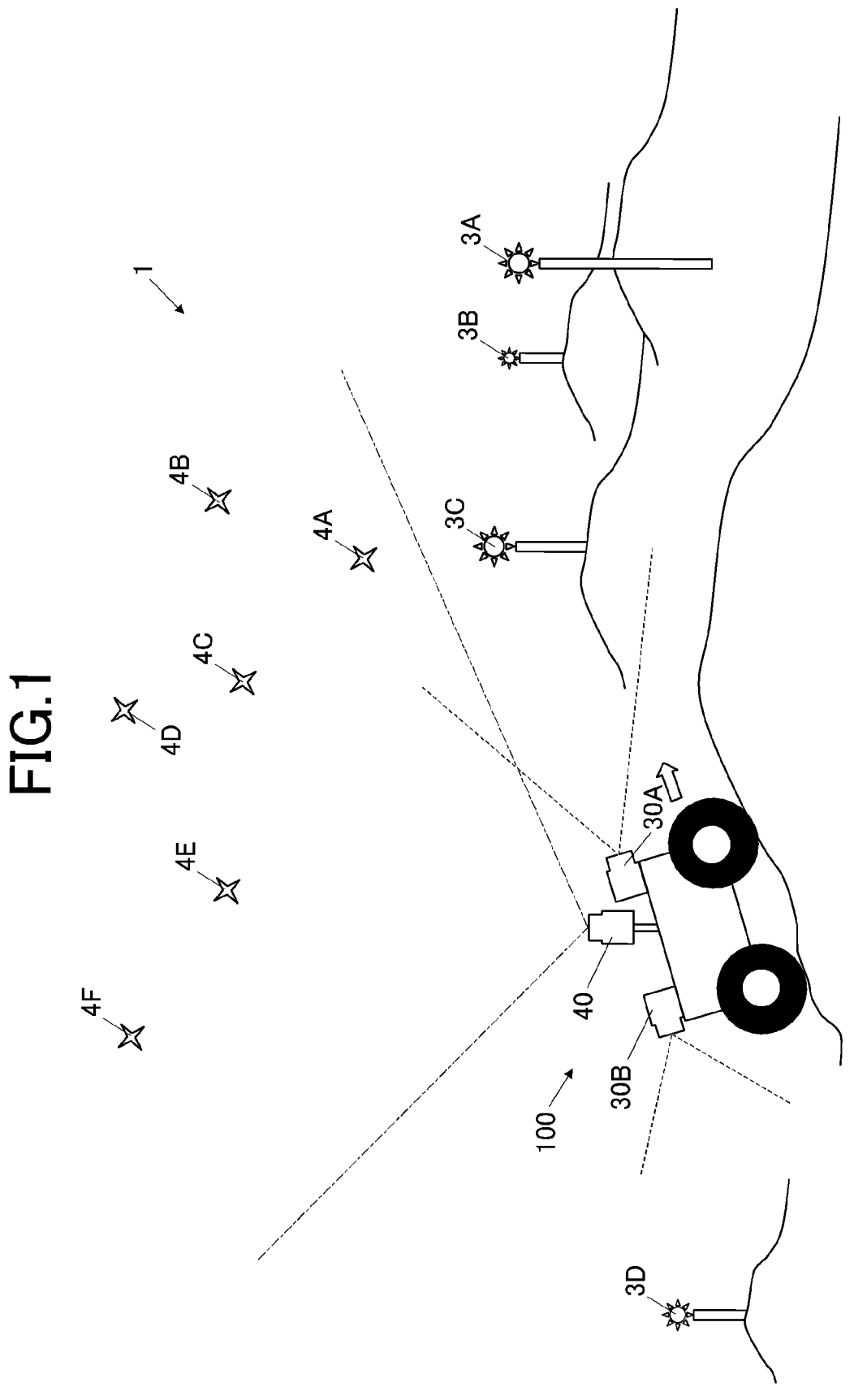
FIG. 1 shows configuration of a positioning system of an embodiment(s) of the present disclosure.

FIG. 1 shows configuration of a positioning system 1 of an embodiment(s). The positioning system 1 includes a moving object 100, a plurality of position indicators 3A, 3B, 3C, 3D, . . . (hereafter "position indicators 3" if they are not distinguished) and a plurality of fixed stars 4A, 4B, 4C, 4D, 4E, 4F, . . . (hereinafter "fixed stars 4" if they are not distinguished). One of the most applicable sites for the positioning system 1 is the lunar surface.

In this embodiment, the moving object 100 includes a position obtaining device according to the present disclosure. The moving object 100 of this embodiment is a lunar rover, but may be an autonomous rover, a robot, a rover that is operated by a person (including an automatic operation mode), or the like.

Since the moving object 100 runs on the lunar surface, which is rich in ups and downs or ruggedness, the moving object 100 measures six degrees of freedom (6DOF) that are a three-axis attitude angle and three-dimensional (3D) coordinates (hereinafter "three-dimensional coordinate position" or "three-dimensional position").

The moving object 100 includes cameras 30A, 30B for visible light communication (second camera(s), hereinafter "visible light communication cameras 30A, 30B") for receiving visible light communication and a camera 40 for a star tracker (first camera, hereinafter "star tracker camera 40") used for determining an attitude angle from an imaged state of the fixed stars 4. The fixed stars 4 are light sources to be imaged by the star tracker camera 40 and used for deriving an attitude angle (first attitude angle) described below. The position indicators 3 are light sources to be imaged by the visible light communication cameras 30A, 30B and used for deriving an attitude angle (second attitude angle) and a three-dimensional position described below. Thus, the fixed stars 4 and the position indicators 3 are different from one another.

In this embodiment, the moving object 100 obtains information on the visible light communication using two cameras, one as a front camera and the other as a rear camera. The front camera is the visible light communication camera 30A facing forward in which the moving object 100 moves/travels. The rear camera is the visible light communication camera 30B facing the opposite, i.e., rearward. These two cameras, namely, the front camera and the rear camera, are used in order to ensure the detection area where the visible light communication can be detected and to prevent correction errors of optical distortions of lenses or the like. If the distortion correction can be performed well, a single camera with an ultra-wide-angle lens may be used. Hereinafter, where the visible light communication cameras 30A, 30B are not distinguished, they are referred to as "visible light communication cameras 30".

On the lunar surface, which is the operating area of the moving object 100, the position indicators 3 as light sources are installed at intervals.

The position indicators 3 include light emitting diodes (LEDs). The position indicators 3 control light emission or reflection by color modulation or luminance (intensity) modulation in the range of wavelengths of visible light and transmit information. For example, the position indicators 3 each transmit at least unique identification information (light source ID capable of uniquely identifying itself) using a pattern of three colors, R (red), G (green) and B (blue). The installation position (three-dimensional position) in the world coordinate system (X, Y, Z) of each position indicator 3 is measured at the time of installation. A correspondence relationship between the light source ID and the three-dimensional position of each position indicator 3 is stored in a light source ID to three-dimensional position table 21 (shown in FIG. 3 and FIG. 4) in the moving object 100.

If the position indicators 3 are capable of transmitting data of a sufficient amount of information, they may transmit data of their positions and heights (three-dimensional positions) on and from the lunar surface.

In order to be visible from a place far away across ups and downs of the lunar surface, the position indicators 3 have sufficient heights or are placed at raised areas (at high altitudes).

As power sources of the position indicators 3, solar cells or the like are used. If the position indicators 3 are operated during the night period of the moon too, namely, the period in which the moon faces the side opposite to the sun, the position indicators 3 have high-capacity charger mechanisms to deal with the period.

The size of the light emitters (LEDs) of the position indicators 3 is determined on the basis of a required communication distance, a resolution and a lens of each camera, and so forth. For example, if a 4K resolution camera with a lens of a 100-degree horizontal angle of view is used as each visible light communication camera 30, one pixel is approximately 0.025 degrees. As each visible light communication camera 30, a camera with a frame rate of 30 fps or 60 fps can be used.

In the visible light communication, although it is ideal if color modulation or luminance modulation is stably captured in an image of one pixel, the spatial frequency is limited in practice due to the structure of an optical system and/or an image sensor. Then, assuming that color modulation or luminance modulation is stably captured in an image of a three-pixel square or larger, if the light sources (position indicators 3) each have a size of a one-meter square, the distance by which the apparent diameter (angular diameter) of each light source becomes 0.075 degrees is "1/tan (0.075)°=approximately 763 m", which is the communication limit distance, namely, the maximum communication distance.

In practice, however, since there is no atmospheric scattering on the lunar surface and the surroundings are dark even during the daytime, the light sources are seen blurred and large in the dark background due to the halation effect. This makes the maximum communication distance two to three times the theoretical value.

Figure 2:
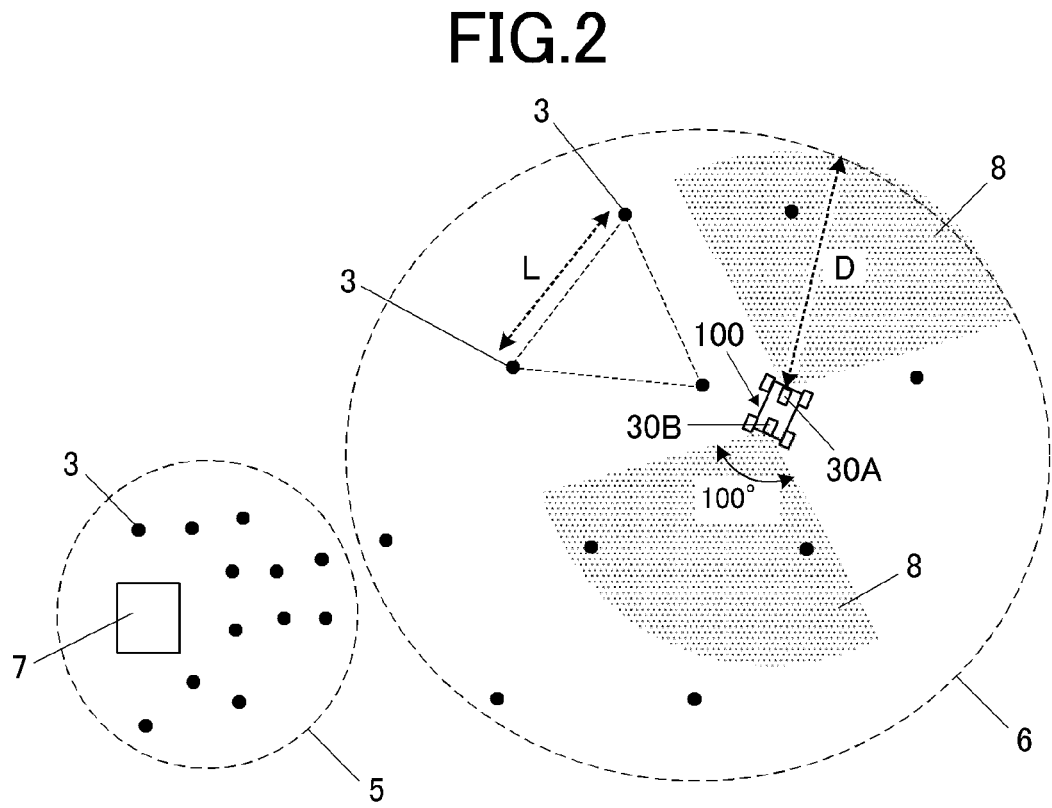
FIG. 2 is a top view of a positioning area, showing an example of arrangement of position indicators.

FIG. 2 is a top view of a positioning area, showing an example of arrangement of the position indicators 3 (visible light communication transmitters). Precision of positioning using the visible light communication depends on the installation density of the position indicators 3. Hence, the position indicators 3 are arranged in a high-precision area 5 and a standard-precision area 6 in accordance with precisions required therein. For example, in the vicinity of a base 7 where high-precision positioning is required or a place where high-speed movement is desired, the position indicators 3 are installed at a high density to constitute the high-precision area 5. Meanwhile, in the standard-precision area 6, the position indicators 3 are arranged at the minimum density to meet a positioning condition(s) or higher.

As an example of the method for arranging the position indicators 3 in the standard-precision area 6 at the minimum density or higher, the position indicators 3 are arranged such that the distance between any two position indicators 3 is less than the maximum communication distance D for the visible light communication. If the maximum communication distance D is 763 m, an arrangement interval L between any two position indicators 3 is set to, for example, 700 m, and the position indicators 3 are arranged at apexes of equilateral triangles having each side of L assuming that the standard-precision area 6 is covered with the equilateral triangles.

As shown in FIG. 2, fan-shaped areas 8 formed with a horizontal angle of view of 100 degrees and a radius of the maximum communication distance D (763 m) from the visible light communication cameras 30A, 30B in the front and rear directions of the moving object 100 are areas where the visible light communication can be received. If the position indicators 3 are arranged at the apexes of the equilateral triangles, no matter which azimuths the visible light communication cameras 30A, 30B face at any position in the standard-precision area 6, these two front and rear cameras together can receive at least two light source IDs. In most cases, they can receive three or more light source IDs.

It is unnecessary to arrange the position indicators 3 to form exact equilateral triangles. If restrictions are imposed on the installation positions or directions of the position indicators 3, the position indicators 3 are arranged at positions optimized therefor. In an area with a topographical problem, the position indicators 3 are individually placed to fit the configuration of the ground.

[Configuration of Moving Object]

Figure 3:
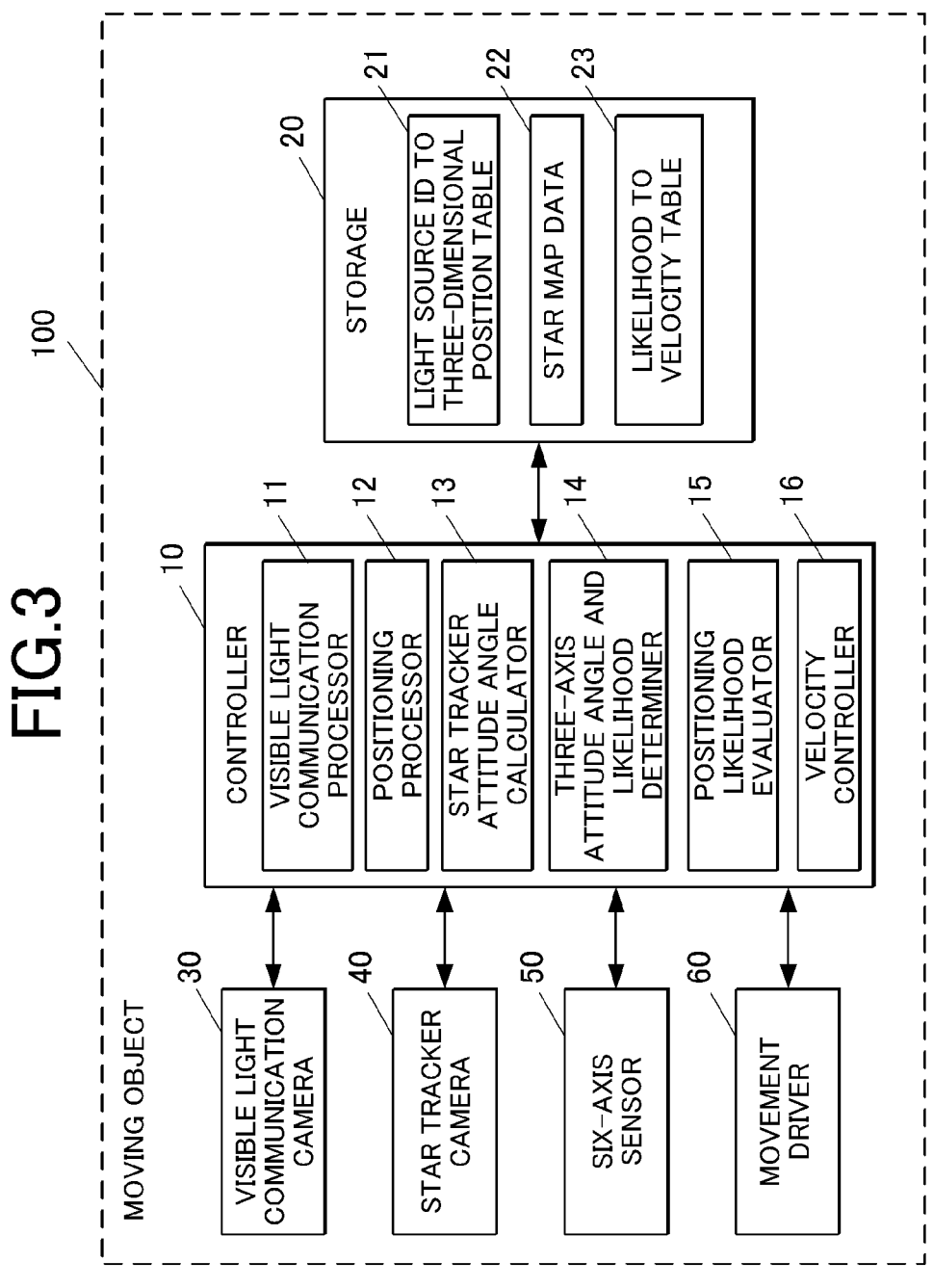
FIG. 3 is a block diagram of a moving object.

FIG. 3 is a block diagram of the moving object 100. As shown in FIG. 3, the moving object 100 includes a controller 10 (processor), a storage 20 (memory), the visible light communication cameras 30 (30A, 30B), the star tracker camera 40, a six-axis sensor 50 and a movement driver 60 (driver).

The controller 10 includes at least one CPU (Central Processing Unit). The controller 10 controls the components of the moving object 100 in accordance with programs stored in the storage 20.

The controller 10 includes a visible light communication processor 11, a positioning processor 12, a star tracker attitude angle calculator 13, a three-axis attitude angle and likelihood determiner 14, a positioning likelihood evaluator 15 and a velocity controller 16. These parts of the controller 10 are realized by software processing by the CPU and a program(s) stored in the storage 20 working together. These parts of the controller 10 will be detailed later.

The storage 20 stores programs that are executed by the controller 10, various setting data and so forth. The programs are stored in the storage 20 in the form of computer-readable program code. As the storage 20, an HDD (Hard Disk Drive), an SSD (Solid State Drive) and/or the like are used.

The storage 20 stores the light source ID to three-dimensional position table 21 mentioned above, star map data 22, and a likelihood to velocity table 23.

In the light source ID to three-dimensional position table 21, as to each of the position indicators 3, a light source ID of a position indicator 3 is associated with a three-dimensional position of the position indicator 3 as its installation position. The light source ID to three-dimensional position table 21 is used for the positioning using the visible light communication.

In the star map data 22, data of the positions of the fixed stars 4 in the sky and information on movements of heavenly bodies are recorded. The star map data 22 is used for calculating an absolute attitude angle with the star tracker.

In the likelihood to velocity table 23, each positioning likelihood (overall likelihood) is associated with the maximum velocity allowed for the positioning likelihood. The positioning likelihood is the likelihood of the entire positioning. The maximum velocity includes the maximum speed in the direction of travel and the maximum angular velocity in turning. Instead of the likelihood to velocity table 23, a relational expression may be stored in the storage 20. The relational expression is an expression by which an allowable maximum velocity is derived when a likelihood is input.

The visible light communication cameras 30 take optical images of light entering through the lenses and generate two-dimensional (2D) image data. The visible light communication cameras 30 perform continuous shooting in terms of time and output continuous image data to the controller 10 (visible light communication processor 11). The visible light communication cameras 30 take images of the position indicators 3 and so forth.

The star tracker camera 40 takes optical images of light entering through the lens and generates image data. The star tracker camera 40 outputs the generated image data to the controller 10 (star tracker attitude angle calculator 13). The star tracker camera 40 takes images of the fixed stars 4 and so forth.

The six-axis sensor 50 includes well-known three-axis accelerometer and three-axis angular velocity sensor (gyro sensor). The six-axis sensor 50 outputs, for example, accelerations in directions of three axes and angular velocities relative to (around) the three axes to the controller 10 (three-axis attitude angle and likelihood determiner 14). In general, a six-axis sensor has a high response speed and a response frequency of tens to hundreds of Hz, and while a three-axis attitude angle is calculated from six-axis data (accelerations in directions of three axes and angular velocities relative to the three axes) of a six-axis sensor, integration error increases with time due to accumulation of drift error of its gyro sensor.

The movement driver 60 is a driver that drives wheels for the moving object 100 to run/move, changes the moving direction (direction of travel) of the moving object 100, and so forth. The movement driver 60 moves its device (moving object 100).

Figure 4:
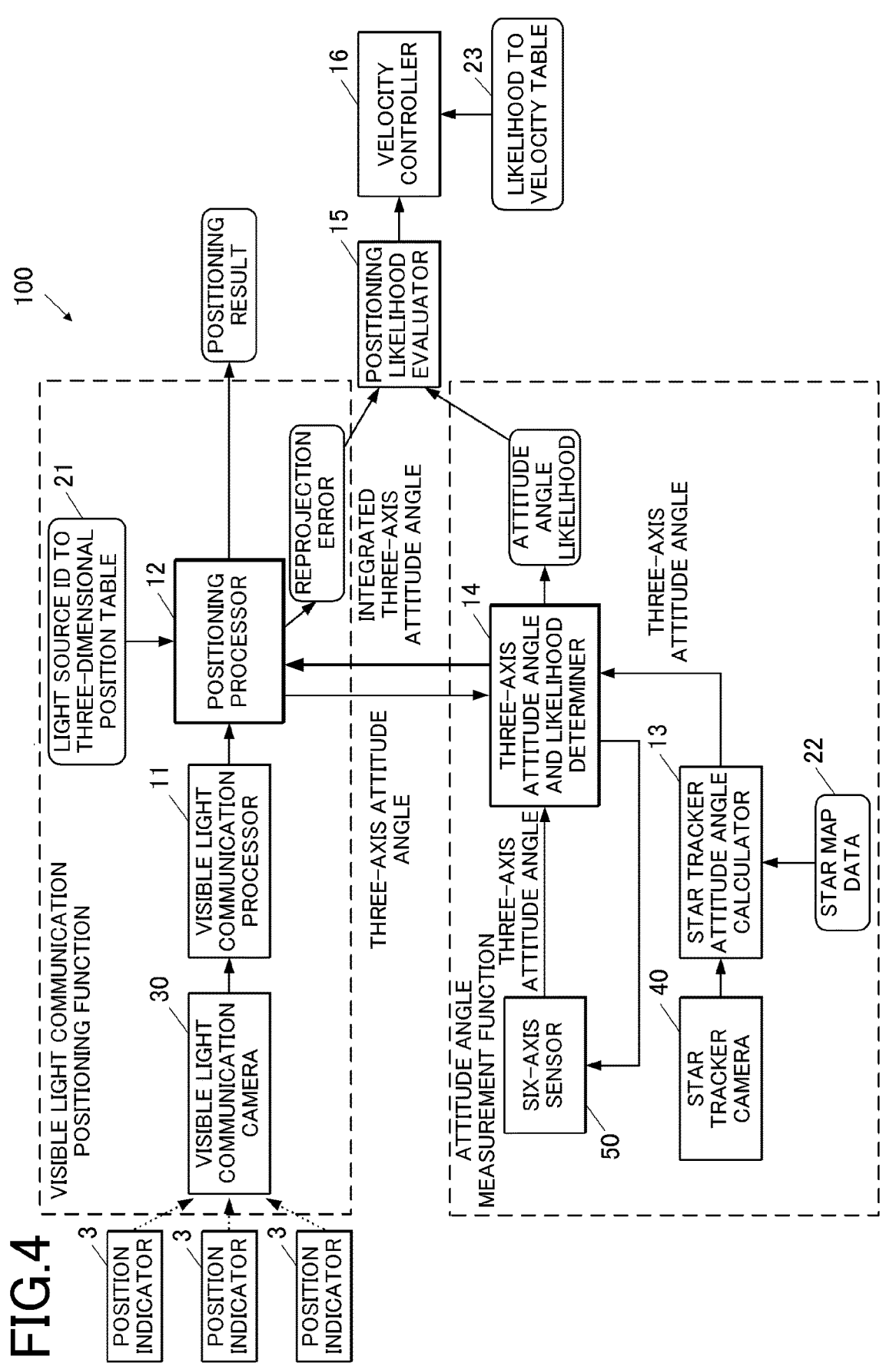
FIG. 4 is a functional block diagram of the moving object.

FIG. 4 is a functional block diagram of the moving object 100. As shown in FIG. 4, the moving object 100 includes the visible light communication processor 11, the positioning processor 12, the star tracker attitude angle calculator 13, the three-axis attitude angle and likelihood determiner 14, the positioning likelihood evaluator 15, the velocity controller 16, the visible light communication cameras 30, the star tracker camera 40 and the six-axis sensor 50.

The visible light communication cameras 30, the visible light communication processor 11 and the positioning processor 12 realize a visible light communication positioning function. The visible light communication positioning function is a function related to visible light communication and geometric positioning calculation (PnP problem or Perspective-n-Point) using the visible light communication. The PnP problem is a problem of estimating the position and the attitude (posture) of a camera from a correspondence relationship between three-dimensional positions of n points in the world coordinate system and (two-dimensional) coordinate positions of the points projected onto an image plane.

The star tracker camera 40, the star tracker attitude angle calculator 13, the three-axis attitude angle and likelihood determiner 14 and the six-axis sensor 50 realize an attitude angle measurement function. The attitude angle measurement function is a function related to three-axis attitude angle measurement.

Hereinafter, the three-axis attitude angle that is obtained by each of the star tracker, the six-axis sensor 50 and the PnP positioning matches the three-axis attitude angle of the vehicle (moving object 100).

The visible light communication processor 11 analyzes image data of images taken by continuous shooting by the visible light communication cameras 30 to detect, from light emission points (position indicators 3) captured in the images, their light source IDs indicated by the visible light communication. The visible light communication processor 11 obtains, as to each of the light emission points on the images, a pair of a light source ID of a light emission point and a coordinate position thereof on the images (two-dimensional plane).

The positioning processor 12 performs the positioning of the moving object 100 (visible light communication cameras 30) on the basis of the coordinate positions on the images and known three-dimensional positions (installation positions of the position indicators 3) associated with the respective light source IDs received by the visible light communication. The positioning processor 12 outputs a positioning result of six degrees of freedom (6DOF) in total, namely, the three-axis attitude angle and the three-dimensional position in the world coordinate system (coordinates on the lunar-surface plane and height from the plane) of the visible light communication cameras 30. The "three-axis attitude angle of the visible light communication cameras 30" means the three-axis attitude angle of the two visible light communication cameras 30A, 30B treated as a set. That is, an upward change of the pitch angle of the front camera (visible light communication camera 30A) is treated as a downward change of the pitch angle of the rear camera (visible light communication camera 30B), and vice versa.

In this embodiment, the positioning processor 12 obtains, among the six degrees of freedom, the three-axis attitude angle from the three-axis attitude angle and likelihood determiner 14.

If the three-axis attitude angle is known, the positioning processor 12 can calculate the positioning result by the visible light communication processor 11 receiving at least two light source IDs by the visible light communication.

Figure 5:
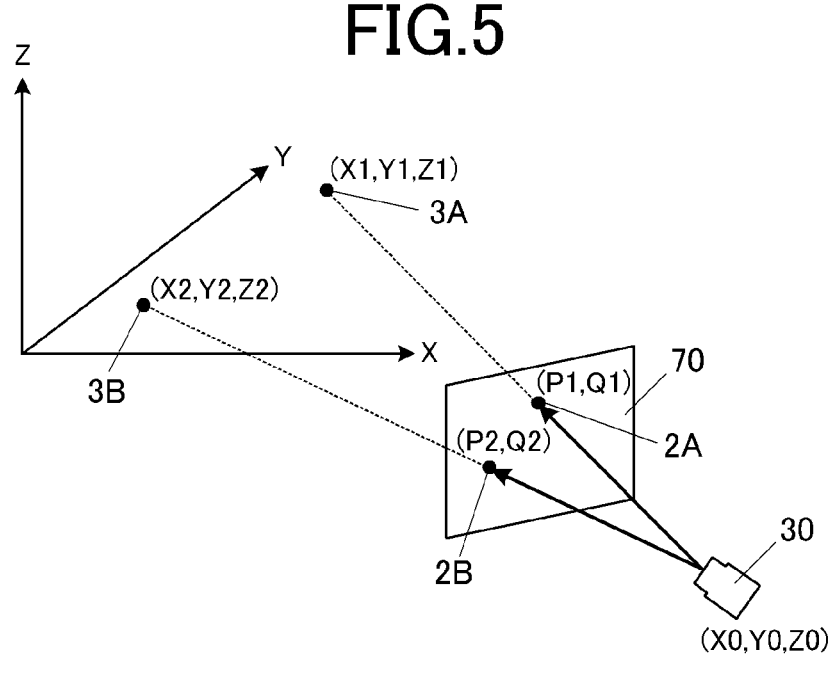
FIG. 5 is an illustration to explain the outline of a positioning process.

With reference to FIG. 5, outline of the positioning (positioning process) will be described. In the example shown in FIG. 5, two position indicators 3A, 3B are in the field of view of a visible light communication camera 30. The positioning processor 12 detects, in an image plane 70 generated by the visible light communication camera 30, light emission points 2A, 2B respectively corresponding to the position indicators 3A, 3B. The coordinate positions of the light emission points 2A, 2B on the image plane 70 are two-dimensional coordinates (P1, Q1), (P2, Q2), respectively.

The three-dimensional positions of the position indicators 3A, 3B in the world coordinate system are known by prior surveys (measurement), and are three-dimensional coordinates (X1, Y1, Z1), (X2, Y2, Z2), respectively.

The positioning processor 12 calculates the three-dimensional position (X0, Y0, Z0) of the visible light communication camera 30 in the world coordinate system from a correspondence relationship between the coordinate positions (P1, Q1), (P2, Q2) on the image (image plane 70) and the three-dimensional positions (X1, Y1, Z1), (X2, Y2, Z2).

The more the light source IDs received by the visible light communication, the more the data to be used by the positioning processor 12 for the positioning, and accordingly the higher the positioning precision.

If six or more light source IDs are received by the visible light communication, the positioning processor 12 concurrently performs a process to solve/obtain all the six degrees of freedom (three-axis attitude angle and three-dimensional position) using only the coordinate information of the group of the light source IDs received. In this case, the positioning processor 12 derives the three-axis attitude angle with a second likelihood too. The positioning processor 12 outputs the three-axis attitude angle obtained only from the information of the visible light communication cameras 30 (three-axis attitude angle based on six or more light source IDs received) to the three-axis attitude angle and likelihood determiner 14.

If the three-axis attitude angle of the moving object 100 is known, the positioning processor 12 derives at least the three-dimensional position of the moving object 100 on the basis of two or more light sources (position indicators 3) and their positions on the images obtained by the visible light communication cameras 30. If the three-axis attitude angle of the moving object 100 is not known, but a predetermined number of light sources (position indicators 3) or more is captured in the images obtained by the visible light communication cameras 30, the positioning processor 12 derives the three-dimensional position and the attitude angle (second attitude angle) of the moving object 100. In this embodiment, the "predetermined number" is six. The more the light sources (position indicators 3) captured in the images obtained by the visible light communication cameras 30, the higher the positioning precision.

The positioning processor 12 detects, in the images obtained by the visible light communication cameras 30, the light source IDs of the position indicators 3 captured in the images and their coordinate positions on the images, obtains the known three-dimensional positions in the world coordinate system associated with the detected light source IDs, and derives the three-dimensional position and the attitude angle of the moving object 100 on the basis of the coordinate positions on the images obtained by the visible light communication cameras 30 and the three-dimensional positions in the world coordinate system.

The positioning processor 12 calculates a reprojection error as a self-evaluation index of the positioning result. More specifically, the positioning processor 12 obtains, on the basis of the positioning result, the reprojection error as an index indicating the difference (distance) between a reprojected point of the known installation position (three-dimensional position) of each position indicator 3 reprojected onto the image plane of the visible light communication cameras 30 and a projected point thereof on the image plane, the projected point being actually caught by the visible light communication cameras 30.

As the self-evaluation index of the positioning result, an internal index of filter calculation in the positioning calculation may be used, for example.

The star tracker attitude angle calculator 13 derives, if a predetermined condition is met, the three-axis attitude angle (first attitude angle) of the moving object 100 on the basis of a plurality of light sources (fixed stars 4) and their positions on an image taken by the star tracker camera 40. In this embodiment, the predetermined condition is that the velocity of the moving object 100 being moved by the movement driver 60 is equal to or less than a predetermined velocity or the moving object 100 is at a standstill. The more the light sources (fixed stars 4) captured in the image obtained by the star tracker camera 40, the higher the positioning precision.

The star tracker attitude angle calculator 13 derives the three-axis attitude angle of the moving object 100 by pattern matching of a positional relationship between the light sources (fixed stars 4) captured in the image obtained by the star tracker camera 40 with light source arrangement data (star map data 22) prepared in advance. Especially in space, the star tracker (star tracker camera 40) performs the most precise angle measurement. The likelihood (first likelihood) of the three-axis attitude angle derived by the star tracker attitude angle calculator 13 is higher than the likelihood (second likelihood) of the three-axis attitude angle based on six or more light source IDs received derived by the positioning processor 12.

However, since the star tracker camera 40 images the fixed stars 4, a long exposure time with high sensitivity is needed, and also the load of the matching process with the star map data 22 is large. Hence, if the moving object 100 is moving faster than a predetermined velocity, the star tracker camera 40 cannot image the fixed stars 4 due to underexposure. For example, in the case of rectilinear travel (linear movement), the higher the velocity of the moving object 100 is, the harder the star tracker camera 40 images the boundary or therearound of the angle of view of itself. Also, a processing response time is long (e.g., 0.1 Hz to several Hz). Thus, there are some technical restrictions.

When the velocity of the moving object 100 falls to or below the predetermined velocity, the star tracker attitude angle calculator 13 can rederive the three-axis attitude angle of the moving object 100 with a first likelihood, using the star tracker camera 40. As described later, when the positioning likelihood of the moving object 100 decreases, the movement driver 60 is controlled to reduce the velocity of the moving object 100. Hence, when the positioning likelihood decreases, the velocity of the moving object 100 decreases to the predetermined velocity or less, so that the star tracker attitude angle calculator 13 can rederive the three-axis attitude angle of the moving object 100 using the star tracker camera 40.

The six-axis sensor 50 derives the three-axis attitude angle (third attitude angle) of the moving object 100 on the basis of output values of the three-axis accelerometer and the three-axis angular velocity sensor.

The three-axis attitude angle and likelihood determiner 14 determines the three-axis attitude angle of the moving object 100 using the result derived by the six-axis sensor 50 (third derived result) instead of or together with the result derived by the star tracker attitude angle calculator 13 (first derived result).

The three-axis attitude angle and likelihood determiner 14 determines the current three-axis attitude angle of the moving object 100 by integrating the three-axis attitude angle obtained by the star tracker and the three-axis attitude angle obtained by the six-axis sensor 50.

More specifically, the three-axis attitude angle and likelihood determiner 14 gives priority to the three-axis attitude angle obtained by the star tracker, and when the star tracker does not function, estimates (obtains) the angle state (three-axis attitude angle) from the six-axis sensor 50.

As described above, if points (light source IDs) received by the visible light communication are six or more, the three-axis attitude angle can be obtained only from the information of the visible light communication cameras 30. If the three-axis attitude angle obtained only from the information of the visible light communication cameras 30 is present, the three-axis attitude angle and likelihood determiner 14 takes this into account to determine the current three-axis attitude angle of the moving object 100.

The three-axis attitude angle and likelihood determiner 14 calculates the likelihood of the three-axis attitude angle (attitude angle likelihood). The attitude angle likelihood is an index indicating the probability of the three-axis attitude angle. The method for calculating the likelihood is not particularly limited. The attitude angle likelihood could rise sharply depending on the method of deriving the attitude angle, but when falling, falls little by little with the passage of time in relation to the previous state of the attitude angle.

In the state in which the moving object 100 stops or in the state in which the moving object 100 is moving at a low velocity, the star tracker functions, so that the attitude angle likelihood is the maximum/highest. The likelihood of the three-axis attitude angle obtained by the star tracker is the likelihood A (1.0).

The likelihood B of the three-axis attitude angle obtained by the PnP positioning based on six or more light source IDs received is determined on the basis of the number of received light source IDs N. The likelihood B (second likelihood) is lower than the likelihood A (first likelihood). The likelihood B is expressed, for example, by a characteristic curve where the likelihood when the number of light source IDs detected by the visible light communication processor 11 (the number of received light source IDs) is six, which is the minimum, is about 0.5 and gradually saturates to 1.

Figure 6:
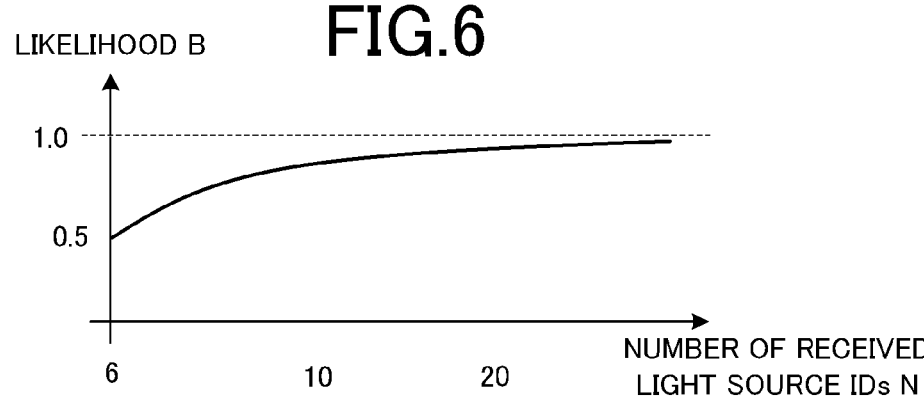
FIG. 6 shows an example of the likelihood of the three-axis attitude angle based on six or more light source IDs received.

FIG. 6 shows an example of the likelihood B of the three-axis attitude angle based on six or more light source IDs received. In FIG. 6, the horizontal axis indicates the number of received light source IDs N, and the vertical axis indicates the likelihood B. The more the light sources (position indicators 3) captured in the images obtained by the visible light communication cameras 30, the higher the likelihood B of the three-axis attitude angle.

The likelihood B is expressed, for example, by Formula 1 below.

[Math. 1]

$$\text{Likelihood } B = 1 - \frac{3}{N} \qquad \text{Formula 1}$$

The positioning processor 12 can derive the three-axis attitude angle of the moving object 100 with the likelihood B (second likelihood) even while the velocity of the moving object 100 being moved by the movement driver 60 is more than the predetermined velocity, namely, regardless of the velocity of the moving object 100.

If the six-axis sensor 50 alone is used for calculation of the three-axis attitude angle, the more the angular displacement (angular change) accumulates with the passage of time, the lower the likelihood C of the three-axis attitude angle obtained by the six-axis sensor 50 becomes. The likelihood C, after calibration of the six-axis sensor 50, first gradually decreases, but from a certain point of time, sharply decreases toward a limit, with use of the six-axis sensor 50. For example, the likelihood C of the three-axis attitude angle obtained by the six-axis sensor 50 decreases if the moving object 100 keeps changing its moving direction (i.e., turning).

As the behavior of the six-axis sensor 50, due to its response frequency or the like, for example, if the moving object 100 changes its direction of travel sharply, an error is likely to be generated, but if the moving object 100 moves slowly, the angle (three-axis attitude angle) can be estimated with a higher likelihood.

Figure 7:
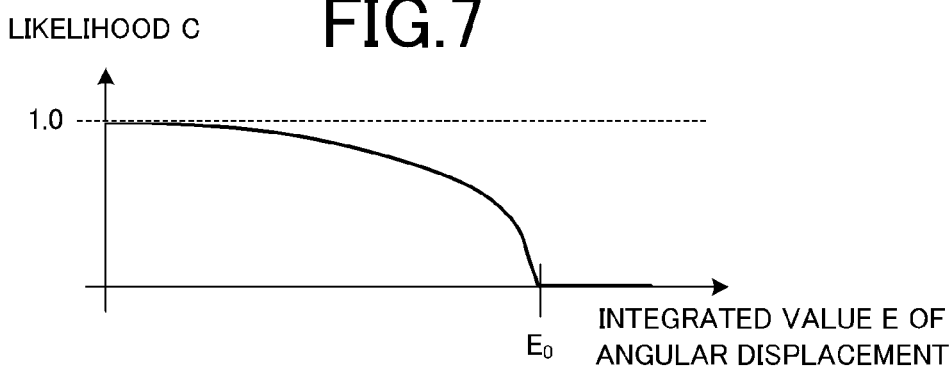
FIG. 7 shows an example of the likelihood of the three-axis attitude angle obtained by a six-axis sensor.

FIG. 7 shows an example of the likelihood C of the three-axis attitude angle obtained by the six-axis sensor 50. In FIG. 7, the horizontal axis indicates the integrated value E of angular displacements obtained by the six-axis sensor 50, and the vertical axis indicates the likelihood C. In FIG. 7, where the integrated value E is greater than a threshold value E0, the likelihood C is 0.

The angular displacement(s) is expressed, for example, by the absolute value of the distance between end points of three-dimensional vectors with start points coincided, the three-dimensional vectors indicating the three-axis attitude angle before and after it changes.

The likelihood C is expressed, for example, by Formula 2 below.

[Math. 2]

$$\text{Likelihood } C = \frac{\sqrt{E_0 - E}}{\sqrt{E_0}} \quad (E \le E_0) \qquad \text{Formula 2}$$
$$\text{Likelihood } C = 0 \qquad (E > E_0)$$

No mathematical rigorousness is put on Formula 2. In practice, the optimal formula in terms of statistical characteristics of error and the overall model design of the entire system is selected.

The positioning processor 12 estimates the attitude angle and the three-dimensional position of the moving object 100 by integrating the result (first derived result, three-axis attitude angle) derived by the star tracker attitude angle calculator 13 and the result (second derived result, three-dimensional position and three-axis attitude angle) derived by the positioning processor 12. In this embodiment, the positioning processor 12 uses, as the derived result of the three-axis attitude angle, the result of the integration (integrated three-axis attitude angle) by the three-axis attitude angle and likelihood determiner 14.

More specifically, the positioning processor 12 gives a greater weight to the result derived by the star tracker attitude angle calculator 13, which derives the three-axis attitude angle with a high likelihood, than to the result derived by the positioning processor 12, and integrates the weighted result derived by the star tracker attitude angle calculator 13 and the weighted result derived by the positioning processor 12.

The positioning likelihood evaluator 15 evaluates the positioning likelihood. More specifically, the positioning likelihood evaluator 15 determines the likelihood of the attitude angle and the three-dimensional position of the moving object 100 estimated by the positioning processor 12. For example, the positioning likelihood evaluator 15 performs weighted averaging on the reprojection error and the attitude angle likelihood to calculate the likelihood of the entire positioning.

In this embodiment, the reprojection error and the attitude angle likelihood are combined to be used as an evaluation value of the positioning. Although the positioning likelihood can be estimated from the reprojection error, due to the nature of reprojection, a reprojection result could be good with the three-axis attitude angle different from the true value; for example, a light emission point corresponding to a position indicator 3 looks the same from different places and different three-axis attitude angles. Hence, the reprojection error alone cannot be used as the evaluation value of the positioning.

The attitude angle likelihood is very important especially for the positioning system 1 that uses the fixed stars 4 and the position indicators 3.

The velocity controller 16 controls the velocity of the moving object 100 being moved by the movement driver 60 in accordance with the likelihood of the attitude angle and the three-dimensional position (likelihood of the entire positioning, i.e., positioning likelihood) of the moving object 100 determined by the positioning likelihood evaluator 15. More specifically, the velocity controller 16 refers to the likelihood to velocity table 23 in the storage 20 to obtain the maximum velocity (maximum speed in the direction of travel and maximum angular velocity in turning) associated with the positioning likelihood (likelihood of the attitude angle and the three-dimensional position), and controls the movement driver 60 to adjust the velocity of the moving object 100 to be equal to or less than the maximum velocity associated with the positioning likelihood. The velocity controller 16 performs this at every point of time while the moving object 100 is moving.

If the reprojection error is obviously an abnormal value, it is necessary to stop the moving object 100 once and redo the entire positioning. For this reason, it is preferable to use not only the attitude angle likelihood but also the reprojection error as the evaluation value of the positioning.

If, of the positioning likelihood, the reprojection error has not worsened much, but the attitude angle likelihood has decreased, the speed in the direction of travel or the direction change (turning) is reduced.

[Operation of Moving Object]

Next, operation of the moving object 100 will be described.

Figure 8:
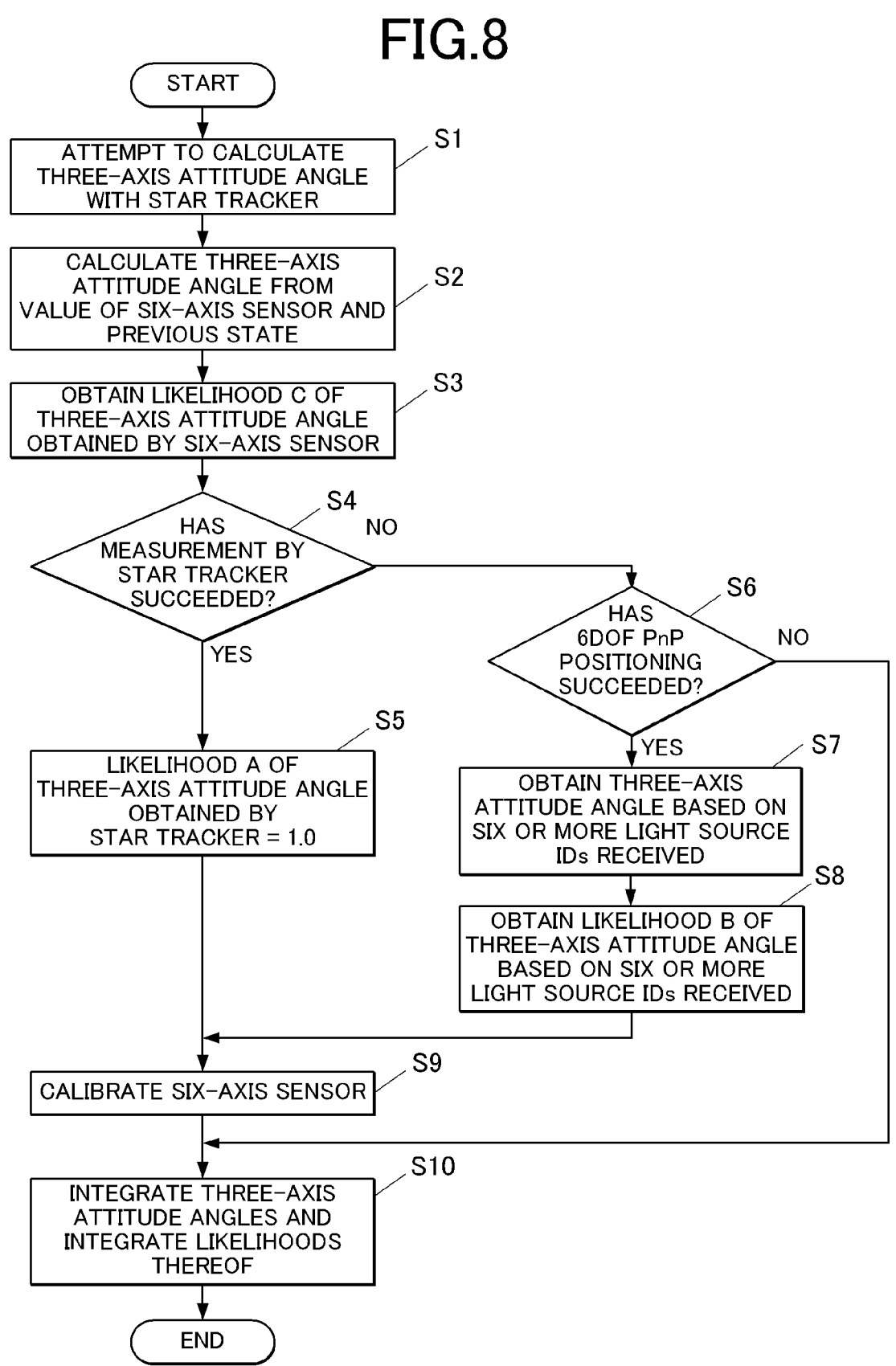
FIG. 8 is a flowchart of a three-axis attitude angle and likelihood determination process.

FIG. 8 is a flowchart of a three-axis attitude angle and likelihood determination process that is performed in the moving object 100.

First, the star tracker attitude angle calculator 13 attempts to calculate the three-axis attitude angle with the star tracker (Step S1). The star tracker attitude angle calculator 13 extracts points from the image data generated by the star tracker camera 40, the points corresponding to the fixed stars 4, performs pattern matching by comparing the extracted points with the star map data 22 to identify which point corresponds to which fixed star 4, and calculates the three-axis attitude angle.

The six-axis sensor 50 calculates the three-axis attitude angle from output values of the three-axis accelerometer and the three-axis angular velocity sensor and the previous state thereof (Step S2). In this embodiment, drift correction with a Kalman filter, a complementary filter or the like is also performed successively.

The three-axis attitude angle and likelihood determiner 14 obtains the likelihood C of the three-axis attitude angle obtained by the six-axis sensor 50 (Step S3). As shown in FIG. 7, the likelihood C decreases as the integrated value E of angular displacements increases. The three-axis attitude angle and likelihood determiner 14 determines the likelihood C of the three-axis attitude angle in accordance with the integrated value E of angular displacements of the calibrated six-axis sensor 50.

The three-axis attitude angle and likelihood determiner 14 also determines whether the measurement by the star tracker has succeeded (Step S4). More specifically, the three-axis attitude angle and likelihood determiner 14 determines whether a measurement result has been obtained from the star tracker attitude angle calculator 13.

If the measurement by the star tracker has succeeded (Step S4; YES), the three-axis attitude angle and likelihood determiner 14 sets the likelihood A of the three-axis attitude angle obtained by the star tracker to 1.0 (Step S5).

If the measurement by the star tracker has failed (Step S4; NO), the three-axis attitude angle and likelihood determiner 14 determines whether the 6DOF PnP positioning by the positioning processor 12 has succeeded, namely, whether six or more light source IDs have been detected by the visible light communication processor 11 (Step S6).

If the 6DOF PnP positioning has succeeded (Step S6; YES), the three-axis attitude angle and likelihood determiner 14 obtains, from the positioning processor 12, the three-axis attitude angle based on six or more light source IDs received (Step S7).

The three-axis attitude angle and likelihood determiner 14 also obtains the likelihood B of the three-axis attitude angle based on six or more light source IDs received (Step S8). As shown in FIG. 6, the lager the number of received light source IDs N, the larger (closer to 1) the likelihood B. The three-axis attitude angle and likelihood determiner 14 determines the likelihood B of the three-axis attitude angle in accordance with the number of received light source IDs N.

After Step S5 or Step S8, the three-axis attitude angle and likelihood determiner 14 (or the like of the controller 10) calibrates the six-axis sensor 50 (Step S9). More specifically, the three-axis attitude angle and likelihood determiner 14 calibrates the six-axis sensor 50 using, if available, the three-axis attitude angle obtained by the star tracker, whereas if not, the three-axis attitude angle based on six or more light source IDs received.

After Step S9 or NO in Step S6 where it is determined that the 6DOF PnP positioning has failed (Step S6; NO), the three-axis attitude angle and likelihood determiner 14 integrates the three-axis attitude angles and integrates the likelihoods of the three-axis attitude angles (Step S10).

For example, if the three-axis attitude angle obtained by the star tracker is present, the three-axis attitude angle and likelihood determiner 14 may use the three-axis attitude angle obtained by the star tracker as it is.

In FIG. 8, if the measurement by the star tracker has succeeded (Step S4; YES), the process does not go through Step S7, where the three-axis attitude angle and likelihood determiner 14 obtains the three-axis attitude angle based on six or more light source IDs received. However, regardless of whether the measurement by the star tracker has succeeded, if there is a result of the PnP positioning based only on the information obtained from the visible light communication cameras 30, namely, the three-axis attitude angle based on six or more light source IDs received, the three-axis attitude angle and likelihood determiner 14 may obtain and make use of this three-axis attitude angle.

Then, the three-axis attitude angle and likelihood determiner 14 may give weights to the three-axis attitude angle obtained by the star tracker, the three-axis attitude angle based on six or more light source IDs received and the three-axis attitude angle obtained by the six-axis sensor 50 in accordance with their respective likelihoods and calculate the weighted average thereof, thereby integrating these to calculate the current three-axis attitude angle. The three-axis attitude angle and likelihood determiner 14 may use, in appropriate combination, two or more of the three-axis attitude angles that have been able to be obtained and integrate these.

Alternatively, the three-axis attitude angle and likelihood determiner 14 may select, from the three-axis attitude angles that has been able to be obtained, the three-axis attitude angle having the highest likelihood.

The three-axis attitude angle and likelihood determiner 14 may reject the calculated three-axis attitude angles regardless of their likelihoods if they are greatly different from their previous states, or they are outside a specified/limited range of the three-axis attitude angle or are outliers.

The three-axis attitude angle and likelihood determiner 14 may give greater weights to the three-axis attitude angle obtained by the star tracker, the three-axis attitude angle based on six or more light source IDs received and the three-axis attitude angle obtained by the six-axis sensor 50 in the order named and integrate the weighted three-axis attitude angles.

For example, if the measurement by the star tracker has succeeded (Step S4; YES) and also the 6DOF PnP positioning has succeeded (Step S6; YES), the three-axis attitude angle and likelihood determiner 14 may multiply the three-axis attitude angle obtained by the star tracker by 0.7, multiply the three-axis attitude angle obtained by the 6DOF PnP positioning by 0.2, multiply the three-axis attitude angle obtained by the six-axis sensor 50 by 0.1, and integrate the obtained values, thereby calculating the current three-axis attitude angle.

As another example, if the measurement by the star tracker has failed (Step S4; NO) but the 6DOF PnP positioning has succeeded (Step S6; YES), the three-axis attitude angle and likelihood determiner 14 may multiply the three-axis attitude angle obtained by the 6DOF PnP positioning by 0.8, multiply the three-axis attitude angle obtained by the six-axis sensor 50 by 0.2, and integrate the obtained values, thereby calculating the current three-axis attitude angle.

As another example, if the measurement by the star tracker has succeeded (Step S4; YES) but the 6DOF PnP positioning has failed (Step S6; NO), the three-axis attitude angle and likelihood determiner 14 may multiply the three-axis attitude angle obtained by the star tracker by 0.9, multiply the three-axis attitude angle obtained by the six-axis sensor 50 by 0.1, and integrate the obtained values, thereby calculating the current three-axis attitude angle.

The three-axis attitude angle and likelihood determiner 14 integrates the likelihoods of the three-axis attitude angles, which have been integrated into one (i.e., integrated three-axis attitude angle or current three-axis attitude angle), to calculate the likelihood of the integrated three-axis attitude angle. For example, the three-axis attitude angle and likelihood determiner 14 calculates the average or the weighted average of the likelihoods of the three-axis attitude angles, which have been integrated into one, thereby obtaining the likelihood of the integrated three-axis attitude angle.

This completes the three-axis attitude angle and likelihood determination process.

In the above, the three-axis attitude angle that is obtained by each of the star tracker, the six-axis sensor 50 and the PnP positioning matches the three-axis attitude angle of the vehicle (moving object 100). However, if the three-axis attitude angle that is obtained by any of the star tracker, the six-axis sensor 50 and the PnP positioning does not match the three-axis attitude angle of the vehicle (moving object 100), the following process may be performed. That is, after Step S10, the three-axis attitude angle and likelihood determiner 14 may calculate an attitude angle variation of the integrated three-axis attitude angle obtained in Step S10 from that at the time of installation. The integrated three-axis attitude angle at the time of installation is stored in the storage 20.

Then, the three-axis attitude angle and likelihood determiner 14 may add the attitude angle variation to the three-axis attitude angle of the visible light communication cameras 30 (moving object 100) at the time of installation to calculate the current three-axis attitude angle of the visible light communication cameras 30. The three-axis attitude angle of the visible light communication cameras 30 at the time of installation is stored in the storage 20.

The likelihood of the three-axis attitude angle of the visible light communication cameras 30 thus calculated is the same as the likelihood (integrated likelihood) of the integrated three-axis attitude angle obtained in Step S10.

Figure 9:
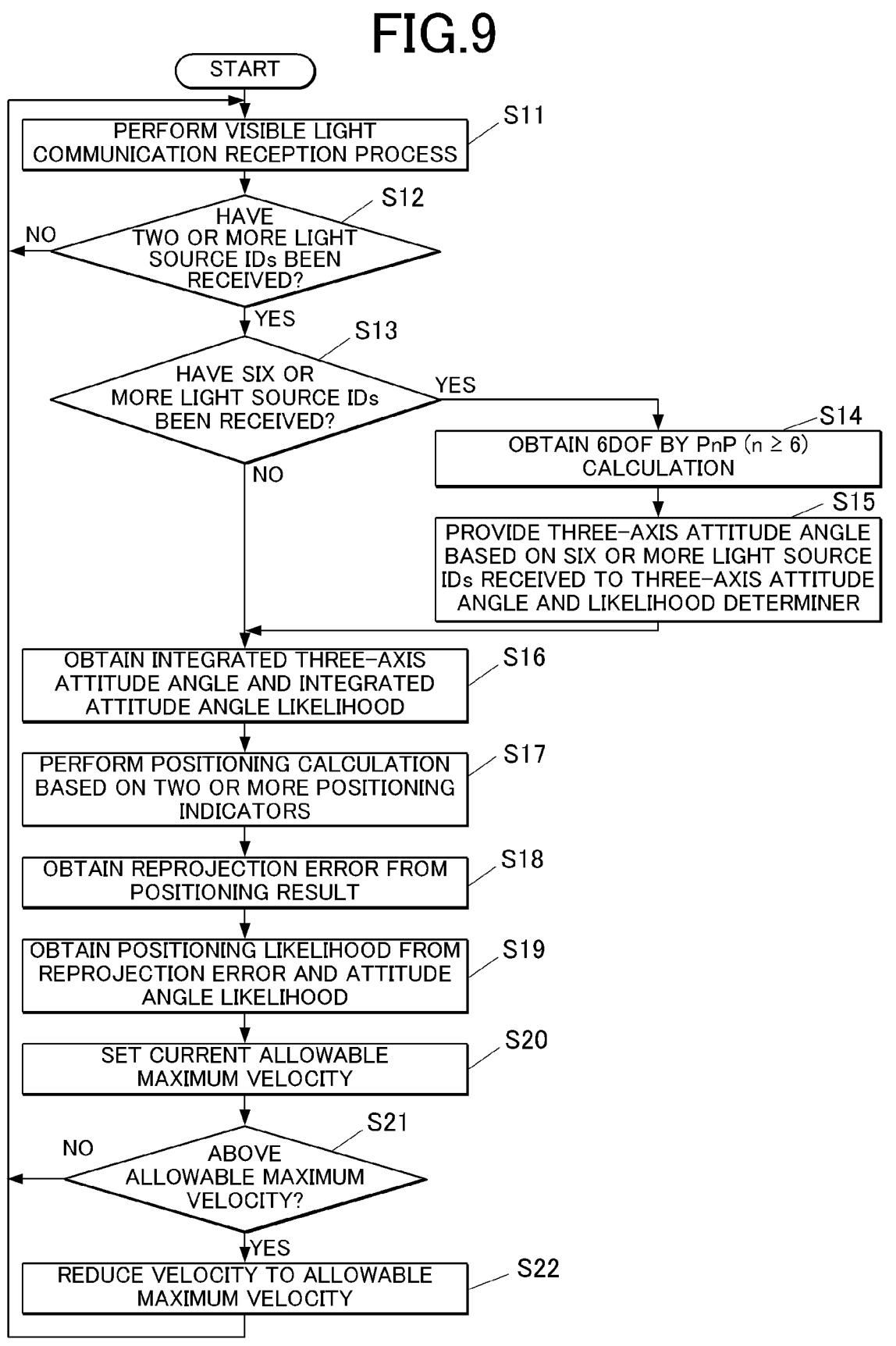
FIG. 9 is a flowchart of an overall process.

FIG. 9 is a flowchart of an overall process that is performed in the moving object 100. Of the overall process, processes other than those relevant to the three-axis attitude angle will be described mainly.

First, the visible light communication processor 11 obtains the image data of the images taken and obtained by the visible light communication cameras 30, and performs a visible light communication reception process (Step S11). More specifically, the visible light communication processor 11 detects, in the images, light emission points corresponding to the position indicators 3, and from each light emission point on the images, obtains a pair of a light source ID indicated by the visible light communication and a coordinate position on the images.

Next, the positioning processor 12 determines whether two or more light source IDs have been received by the visible light communication (Step S12).

If the number of light source IDs received by the visible light communication is less than two (Step S12; NO), the process returns to Step S11.

If two or more light source IDs have been received by the visible light communication (Step S12; YES), the positioning processor 12 determines whether six or more light source IDs have been received by the visible light communication (Step S13).

If six or more light source IDs have been received by the visible light communication (Step S13; YES), the positioning processor 12 obtains 6DOF by PnP (n≥6) calculation on the basis of the light source IDs (Step S14). More specifically, the positioning processor 12 obtains the three-dimensional positions corresponding to the respective light source IDs from the light source ID to three-dimensional position table 21, and calculates the three-axis attitude angle and the three-dimensional position of the moving object 100 on the basis of the coordinate positions on the images and the three-dimensional positions in the world coordinate system.

Next, the positioning processor 12 provides the three-axis attitude angle based on six or more light source IDs received to the three-axis attitude angle and likelihood determiner 14 (Step S15). This "three-axis attitude angle based on six or more light source IDs received" is the three-axis attitude angle that the three-axis attitude angle and likelihood determiner 14 obtains in Step S7 of the three-axis attitude angle and likelihood determination process (FIG. 8).

In Step S13, if the number of light source IDs received by the visible light communication is less than six (Step S13; NO), or after Step S15, the positioning processor 12 obtains the integrated three-axis attitude angle and the integrated attitude angle likelihood from the three-axis attitude angle and likelihood determiner 14 (Step S16). The three-axis attitude angle and the attitude angle likelihood obtained in Step S16 are the integrated values obtained in Step S10 of the three-axis attitude angle and likelihood determination process (FIG. 8).

Next, the positioning processor 12 obtains, as to the two or more light source IDs of the position indicators 3 detected by the visible light communication, the three-dimensional positions corresponding to the respective light sources ID from the light source ID to three-dimensional position table 21, and performs positioning calculation (calculates the three-axis attitude angle and the three-dimensional position) on the basis of (i) the pairs of the coordinate positions on the images and the three-dimensional positions in the world coordinate system associated with the light source IDs and (ii) the integrated three-axis attitude angle obtained in Step S16 (Step S17).

If there is a result of the PnP positioning based only on the information (six or more light source IDs) obtained from the visible light communication cameras 30, the positioning processor 12 may integrate this positioning result (positioning result obtained in Step S14) and the positioning result (positioning result obtained in Step S17) based on the integrated three-axis attitude angle obtained from the three-axis attitude angle and likelihood determiner 14 and the two or more light source IDs.

Next, the positioning processor 12 obtains the reprojection error from the positioning result obtained in Step S17 (Step S18). The reprojection error is a value indicating the likelihood of coordinates.

Next, the positioning likelihood evaluator 15 obtains the positioning likelihood from the reprojection error obtained in Step S18 and the attitude angle likelihood obtained in Step S16 (Step S19). The positioning likelihood evaluator 15 integrates the reprojection error and the attitude angle likelihood to obtain the likelihood of the entire positioning (positioning likelihood).

Next, the velocity controller 16 refers to the likelihood to velocity table 23 to obtain the maximum velocity (maximum speed in the direction of travel and maximum angular velocity in turning) corresponding to the positioning likelihood to set the current allowable maximum velocity (Step S20).

Next, the velocity controller 16 determines whether the velocity of the moving object 100 exceeds the allowable maximum velocity (Step S21). More specifically, the velocity controller 16 determines whether the speed of the moving object 100 in the direction of travel exceeds the set allowable maximum speed in the direction of travel, and also determines whether the angular velocity of the moving object 100 in turning exceeds the set allowable maximum angular velocity in turning.

If the velocity of the moving object 100 does not exceed the allowable maximum velocity (Step S21; NO), the process returns to Step S11.

If the velocity of the moving object 100 exceeds the allowable maximum velocity (Step S21; YES), the velocity controller 16 reduces the velocity (speed in the direction of travel and angular velocity in turning) of the moving object 100 to the allowable maximum velocity (Step S22). That is, the velocity controller 16 controls the movement driver 60 to adjust the velocity of the moving object 100 to be equal to or less than the maximum velocity.

After Step S22, the process returns to Step S11.

In the three-axis attitude angle and likelihood determination process (FIG. 8), if the predetermined condition for the measurement by the star tracker to succeed is not met (Step S4; NO) but six or more light sources (position indicators 3) are captured in the images obtained by the visible light communication cameras 30 and the 6DOF PnP positioning has succeeded (Step S6; YES), the positioning processor 12 may estimate the attitude angle and the three-dimensional position of the moving object 100 on the basis of the three-axis attitude angle and the three-dimensional position of the moving object 100 derived by the 6DOF PnP positioning. That is, the six degrees of freedom (6DOF) obtained by the PnP calculation in Step S14 of the overall process (FIG. 9) may be the attitude angle and the three-dimensional position of the moving object 100 estimated in the end.

If no result derived by the star tracker is present, the positioning may be performed using only the result derived by the visible light communication.

Figure 10:
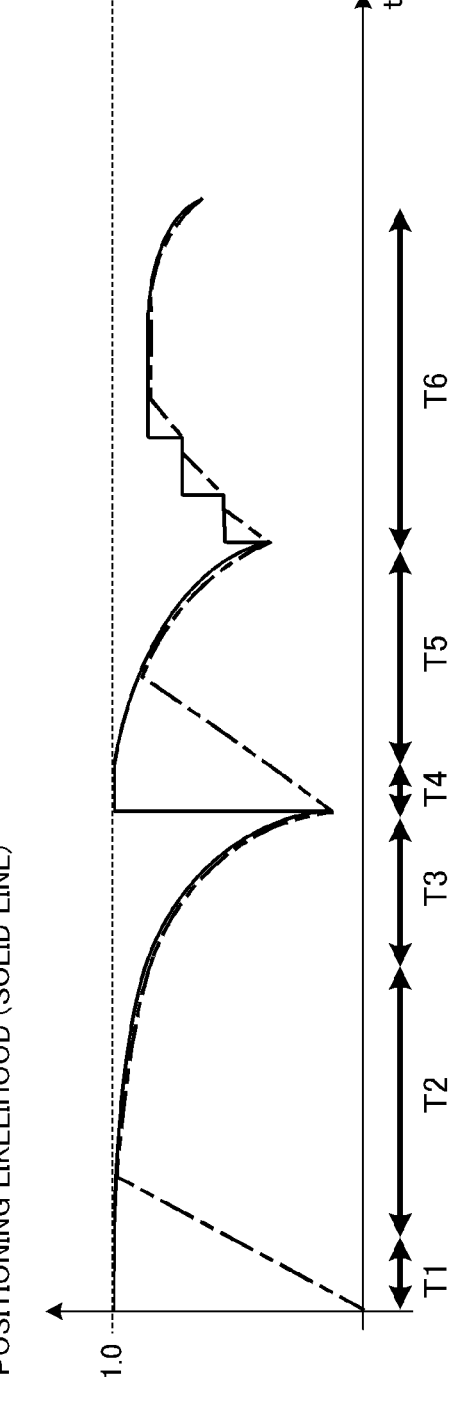
FIG. 10 shows an example of how the positioning likelihood and the velocity fluctuate by changes in the moving state of the moving object.

FIG. 10 shows an example of how the positioning likelihood and the velocity fluctuate by changes in the moving state of the moving object 100.

In FIG. 10, the horizontal axis indicates the passage of time t, and the vertical axis indicates the positioning likelihood and the velocity. In FIG. 10, the positioning likelihood is indicated by a solid line, and the velocity is indicated by a dash-dot-dash line. The "1.0" on the vertical axis is for the positioning likelihood. The positioning likelihood is a value calculated by integrating the reprojection error and the attitude angle likelihood.

In a period T1 that is immediately after the moving object 100 starts moving, the three-axis attitude angle is determined mainly by the star tracker, so that the attitude angle likelihood (likelihood A) is 1.0. Accordingly, the positioning likelihood is also substantially 1.0, and the moving object 100 becomes accelerable. The velocity of the moving object 100 gradually increases.

In a period T2, the measurement by the star tracker becomes difficult, so that the three-axis attitude angle is determined using only the information from the six-axis sensor 50, but because the surface variation level is low, the attitude angle likelihood (likelihood C) does not show sharp decrease. Accordingly, the positioning likelihood decreases little by little. The surface variation level being low means that the moving object 100 mostly travels straight forward and the driving surface has little rise and fall. In the state in which the positioning likelihood is relatively stable, the velocity of the moving object 100 is kept at a certain level or higher.

In a period T3, the three-axis attitude angle continues to be determined only using the information from the six-axis sensor 50, and because the surface variation level becomes higher, the attitude angle likelihood (likelihood C) decreases sharply. Accordingly, the positioning likelihood decreases sharply. The surface variation level being high means that the moving object 100 often changes its direction of travel or the driving surface has great rise and fall. With the decrease in the positioning likelihood, the velocity limit is imposed on the moving object 100.

In a period T4, because the velocity limit has continued to be imposed on the moving object 100 in the period T3, the velocity of the moving object 100 has eventually reached the velocity at which the measurement by the star tracker is performable, so that the positioning likelihood recovers sharply. With the recovery of the positioning likelihood, the moving object 100 becomes accelerable. The velocity of the moving object 100 gradually increases.

In a period T5, the three-axis attitude angle is determined only using the information from the six-axis sensor 50, and because the surface variation level is high, the attitude angle likelihood (likelihood C) decreases sharply. Accordingly, the positioning likelihood decreases sharply. With the decrease in the positioning likelihood, the velocity limit is imposed on the moving object 100.

In a period T6, the surface variation level is high, but because the moving object 100 often enters the high-precision area 5, where six or more light source IDs can be detected in the images taken by the visible light communication cameras 30, the attitude angle likelihood (mainly due to the likelihood B) becomes high at the timing when the positioning based on six or more light source IDs received succeeds. As the attitude angle likelihood increases, the positioning likelihood increases. As the positioning likelihood increases, the velocity of the moving object 100 increases.

As to the integration of the likelihoods of the three-axis attitude angles, while the integrated likelihood is increasing, it is the best value of the values integrated, whereas while the integrated likelihood is decreasing, it is filtered, so that the likelihood does not decrease instantly even if the number of light source IDs received by the visible light communication decreases suddenly.

In the above example, the measurement by the star tracker becomes performable again by the velocity limit being continuously imposed on the moving object 100 until the velocity of the moving object 100 reaches the velocity at which the measurement by the star tracker is performable, so that the positioning likelihood recovers sharply and the moving object 100 becomes accelerable. Alternatively, the measurement by the star tracker may become performable again by a threshold value for the positioning likelihood being set and the moving object 100 being stopped at the timing when the positioning likelihood falls below the threshold value.

As described above, according to the above embodiment, the positioning likelihood evaluator 15 determines the likelihood (positioning likelihood) of the attitude angle and the three-dimensional position of the moving object 100, and the velocity controller 16 controls the velocity of the moving object 100 in accordance with the likelihood. This can, in the measurement of the self-position, prevent decrease in the positioning likelihood and improve the positioning precision.

For example, simply reducing the speed in the direction of travel of the moving object 100 and/or the angular velocity thereof in turning or stopping the moving object 100 can increase the positioning likelihood.

Further, the likelihood (first likelihood) of the attitude angle derived by the star tracker is higher than the likelihood (second likelihood) of the attitude angle based on six or more light source IDs received derived by the positioning processor 12. Use of the attitude angle derived by the star tracker improves the positioning precision.

Further, in response to the velocity of the moving object 100 falling to or below a predetermined velocity, the star tracker attitude angle calculator 13 is capable of redriving the attitude angle of the moving object 100. Limiting the velocity of the moving object 100 can increase the positioning likelihood.

Further, in the moving object 100, the velocity controller 16 obtains, from the likelihood to velocity table 23, the maximum velocity associated with the positioning likelihood, and controls the velocity of the moving object 100 to be equal to or less than the obtained maximum velocity. Controlling the speed in the direction of travel of the moving object 100 and/or the angular velocity thereof in turning based on the positioning likelihood can control the moving object 100 while autonomously maintaining the positioning likelihood at a certain value or higher.

Further, the positioning processor 12 is capable of deriving the attitude angle of the moving object 100 with the likelihood B (second likelihood) by the positioning using the visible light communication, regardless of the velocity of the moving object 100. Hence, even when the attitude angle using the star tracker cannot be derived, the attitude angle of the moving object 100 can be derived.

Further, in response to the attitude angle of the moving object 100 being known, the positioning processor 12 is capable of deriving the three-dimensional position of the moving object 100 based on two or more light sources (position indicators 3) and positions thereof on the images obtained by the visible light communication cameras 30.

More specifically, in the positioning using the visible light communication, the positioning processor 12 uses the values obtained from the star tracker and/or the six-axis sensor 50 as the three degrees of freedom (3DOF) of the attitude angle, and obtains the three-dimensional position (three-dimensional coordinates) as the remaining three degrees of freedom (3DOF). The positioning processor 12 estimates the attitude angle and the three-dimensional position of the moving object 100 by using the attitude angle obtained by the three-axis attitude angle and likelihood determiner 14 and on the basis of the positions of the position indicators 3 on the images obtained by the visible light communication cameras 30. This can reduce the number of light emission points (light source IDs) required to be detected in the images for the positioning that can deal with the driving surface that causes change in the height and/or change in the attitude angle of the moving object 100.

Since the positioning is performable if two or more light emission points (light source IDs) can be detected in the images, the number of position indicators 3 and the installation density thereof can be reduced as compared with a conventional positioning method that always requires six or more position indicators 3 to be imaged by cameras.

Further, the more the light sources (position indicators 3) captured in the images obtained by the visible light communication cameras 30, the higher the likelihood B (second likelihood) of the attitude angle based on six or more light source IDs received. Hence, in the positioning using the visible light communication, the more the light source IDs detected in the images, the higher the precision of the positioning result to be obtained.

Further, the star tracker attitude angle calculator 13 derives the three-axis attitude angle of the moving object 100 by pattern matching of the positional relationship between the fixed stars 4 captured in the image obtained by the star tracker camera 40 with the star map data 22. This can provide the absolute attitude angle of the moving object 100 with high precision.

Especially on the lunar surface, even on the side facing the sun, the fixed stars 4 are visible in the sky, so that the attitude angle can be obtained using the star tracker.

Further, in the positioning using the visible light communication, the positioning processor 12 can derive the three-dimensional position and the attitude angle of the moving object 100 based on the coordinate positions of the position indicators 3 on the images obtained by the visible light communication cameras 30 and the three-dimensional positions of the position indicators 3 in the world coordinate system.

Those described in the above embodiment are not limitations but examples of the position obtaining device according to the present disclosure. The detailed configurations and operations of the components constituting the position obtaining device can be appropriately modified without departing from the scope of the present disclosure.

[First Modification]

In a first modification, the light sources to be imaged by the visible light communication cameras 30 are not limited to those capable of transmitting the light source IDs.

In the above embodiment, in the wide area where positioning is required, the position indicators 3 are arranged such that at least two position indicators 3 are visible from the visible light communication cameras 30. However, the fewer the number of position indicators required and the lower the installation cost per position indicator, the higher the practicality.

It is unnecessary that all the light sources to be imaged by the visible light communication cameras 30 are the position indicators 3 capable of transmitting the light source IDs. Some of the light sources may be high-luminance auxiliary light sources. As with the position indicators 3, the three-dimensional coordinates (three-dimensional positions) of the installation positions of the auxiliary light sources are known. In the images taken and obtained by the visible light communication cameras 30, the auxiliary light sources can also be individually identified from a positional relationship between these and the position indicators 3 arranged around the auxiliary light sources, the position indicators 3 being capable of transmitting the light source IDs, so that the coordinate positions of the auxiliary light sources on the images can be obtained. Since the auxiliary light sources do not require the function to transmit the light source IDs, their structures can be simplified, and cost can be reduced.

Further, since the lunar space is a vacuum with no atmospheric scattering and the background is always dark, auxiliary light sources making use of the sunlight may be used on the assumption that they are used in the daylight condition. For example, if as the auxiliary light sources, those reflecting and diffusing the sunlight as appropriate are placed high enough to use the sky as the background, they can be powerless high-luminance indicators.

The powerless auxiliary light sources are each configured such that a semi-transparent diffuser with a transmittance of 50-70% forms a cuboid, a sphere, a prism, a cylinder, or the like. If the sun and the visible light communication cameras 30 are on the same side with respect to the auxiliary light sources, the auxiliary light sources can be seen shining with high luminance from the visible light communication cameras 30 mainly by their semi-transparent diffusers diffusely reflecting the sunlight. Meanwhile, if the sun and the visible light communication cameras 30 are on the opposite sides with respect to the auxiliary light sources, the auxiliary light sources can be seen shining with high luminance from the visible light communication cameras 30 mainly by their semi-transparent diffusers transmitting the sunlight.

Thus, use of the powerless position indicators as the auxiliary light sources that are installed to fill gaps between the position indicators 3, which transmit the light source IDs, can significantly reduce both the cost of light sources themselves and the installation cost thereof for the wide area as a whole.

[Second Modification]

In a second modification, the star tracker is not used for obtaining the three-axis attitude angle.

In the above embodiment, the star tracker is used for obtaining the absolute attitude angle of the moving object 100. However, the present disclosure is also applicable to situations/sites other than outer space, which includes the lunar surface. The present disclosure is effective on the earth too, such as in a wide indoor or underground area where satellite positional information is unavailable or in an area where geomagnetism is unstable.

For example, in a wide underground space, as the light sources to be imaged by a camera (first camera) different from the visible light communication cameras 30, well-known lighting devices or the like are used instead of the fixed stars 4. In order to use this camera in the completely same manner as a star tracker, the lighting devices are arranged irregularly so that they can be individually identified.

More specifically, the attitude angle of the moving object 100 is derived by pattern matching of a positional relationship between the lighting devices captured in the image taken and obtained by the camera with light source arrangement data (data in which arrangement of the lighting devices is recorded) prepared in advance. The other processes are the same as those in the above embodiment.

In the above embodiment, two cameras of the front camera and the rear camera are used as the visible light communication cameras 30, but three or more cameras may be used as the visible light communication cameras 30.

Although a series of steps of the positioning (positioning process) using the visible light communication cameras 30 can be performed with one camera, two cameras, or three or more cameras, the most recommended configuration to realize high-precision positioning with the detection area and the resolution of cameras is the configuration with two cameras as the front camera and the rear camera.

If pixels are distributed to cameras (the number of pixels in total is unchanged), it is better to limit the angle of view to the front and rear directions than to try to have a 360-degree angle of view, so that the pixels can be finely caught (more distant imaging targets can be identified). Hence, in most cases, two cameras with the same angle of view mounted on the front and the rear of the moving object 100 are better than a single camera with twice the angle of view of each of the two cameras mounted thereon, in terms of a good balance between detection of the light source IDs and precision thereof in the visible light communication.

In the case where images are taken with two angles of view, even if two cameras of one facing forward and the other facing 90-degree sideward are mounted on the moving object 100, the mathematical processing model is the same as that of the front camera and the rear camera mounted on the moving object 100. However, for example, if only two light source IDs are received, the precision depends on the horizontal apparent diameter. Hence, the positioning relationship to obtain images at an angle (e.g., 180 degrees) most apart from one another (e.g., front and rear) is the best.

Further, the computer-readable storage medium storing the program(s) for the aforementioned processes is not limited to those described above. The computer-readable storage medium may be a nonvolatile memory, such as a flash memory, or a portable storage medium, such as a CD-ROM. Further, as a medium to provide data of the program(s) via a communication line, a carrier wave may be used.

The invention claimed is:

1. A position obtaining device comprising:
a driver that moves the position obtaining device; and
a processor that
    in response to a velocity of the position obtaining device that is being moved by the driver being equal to or less than a predetermined velocity, derives a first attitude angle with a first likelihood as an attitude angle of the position obtaining device, the first likelihood being a reliability indicator estimated by using a first light source that has a known position and does not perform light communication,
    in response to a predetermined number of second light sources or more that perform the light communication being captured in an image obtained by a second camera, derives a three-dimensional position of the position obtaining device and a second attitude angle with a second likelihood lower than the first likelihood as the attitude angle of the position obtaining device, the second likelihood being a reliability indicator estimated by using the second light sources,
    determines an overall likelihood of the attitude angle and the three-dimensional position of the position obtaining device estimated based on a first derived result of the first attitude angle and a second derived result of the three-dimensional position and the second attitude angle, and
    controls the velocity of the position obtaining device, which is being moved by the driver, in accordance with the determined overall likelihood of the attitude angle and the three-dimensional position of the position obtaining device.

2. The position obtaining device according to claim 1, wherein in response to the velocity falling to or below the predetermined velocity, the processor is capable of rederiving the first attitude angle.

3. The position obtaining device according to claim 1, further comprising a memory that stores at least one overall likelihood and at least one maximum velocity associated with one another,
    wherein the processor obtains, from the memory, a maximum velocity associated with the overall likelihood of the attitude angle and the three-dimensional position of the position obtaining device, and controls the velocity of the position obtaining device to be equal to or less than the obtained maximum velocity.

4. The position obtaining device according to claim 2, further comprising a memory that stores at least one overall likelihood and at least one maximum velocity associated with one another,
    wherein the processor obtains, from the memory, a maximum velocity associated with the overall likelihood of the attitude angle and the three-dimensional position of the position obtaining device, and controls the velocity of the position obtaining device to be equal to or less than the obtained maximum velocity.

5. The position obtaining device according to claim 1, wherein the processor is capable of deriving the second attitude angle with the second likelihood regardless of the velocity of the position obtaining device.

6. The position obtaining device according to claim 2, wherein the processor is capable of deriving the second attitude angle with the second likelihood regardless of the velocity of the position obtaining device.

7. The position obtaining device according to claim 1, wherein in response to the attitude angle of the position obtaining device being known, the processor is capable of deriving the three-dimensional position of the position obtaining device based on two or more second light sources and positions thereof on the image obtained by the second camera.

8. The position obtaining device according to claim 2, wherein in response to the attitude angle of the position obtaining device being known, the processor is capable of deriving the three-dimensional position of the position obtaining device based on two or more second light sources and positions thereof on the image obtained by the second camera.

9. The position obtaining device according to claim 1, wherein the more the second light sources captured in the image obtained by the second camera, the higher the second likelihood.

10. The position obtaining device according to claim 2, wherein the more the second light sources captured in the image obtained by the second camera, the higher the second likelihood.

11. The position obtaining device according to claim 1, wherein the processor derives the first attitude angle based on a plurality of the first light sources and positions thereof on an image obtained by a first camera.

12. The position obtaining device according to claim 2, wherein the processor derives the first attitude angle based on a plurality of the first light sources and positions thereof on an image obtained by a first camera.

13. The position obtaining device according to claim 11, wherein the processor derives the first attitude angle by pattern matching of a positional relationship between the first light sources captured in the image obtained by the first camera with light source arrangement data prepared in advance.

14. The position obtaining device according to claim 13, wherein the first light sources are fixed stars.

15. The position obtaining device according to claim 1,
    wherein the second light sources modulate light and transmit their respective pieces of identification information, and
    wherein the processor
        detects, from the image obtained by the second camera, the pieces of identification information and coordinate positions of the respective second light sources on the image, obtains known three-dimensional positions in a world coordinate system associated with the respective pieces of identification information, and derives the three-dimensional position and the second attitude angle of the position obtaining device based on the coordinate positions on the image obtained by the second camera and the three-dimensional positions in the world coordinate system.

16. The position obtaining device according to claim 2, wherein the second light sources modulate light and transmit their respective pieces of identification information, and wherein the processor detects, from the image obtained by the second camera, the pieces of identification information and coordinate positions of the respective second light sources on the image, obtains known three-dimensional positions in a world coordinate system associated with the respective pieces of identification information, and derives the three-dimensional position and the second attitude angle of the position obtaining device based on the coordinate positions on the image obtained by the second camera and the three-dimensional positions in the world coordinate system.

17. A position obtaining method for a position obtaining device including a driver that moves the position obtaining device, comprising:

in response to a velocity of the position obtaining device that is being moved by the driver being equal to or less than a predetermined velocity, deriving a first attitude angle with a first likelihood as an attitude angle of the position obtaining device the first likelihood being a reliability indicator estimated by using a first light source that has a known position and does not perform light communication;

in response to a predetermined number of second light sources or more that perform the light communication being captured in an image obtained by a second camera, deriving a three-dimensional position of the position obtaining device and a second attitude angle with a second likelihood lower than the first likelihood as the attitude angle of the position obtaining device, the second likelihood being a reliability indicator estimated by using the second light sources;

determining an overall likelihood of the attitude angle and the three-dimensional position of the position obtaining device estimated based on a first derived result of the first attitude angle and a second derived result of the three-dimensional position and the second attitude angle; and controlling the velocity of the position obtaining device, which is being moved by the driver, in accordance with the determined overall likelihood of the attitude angle and the three-dimensional position of the position obtaining device.

18. A non-transitory computer-readable storage medium storing a program that causes, of a position obtaining device including a driver that moves the position obtaining device, a computer to:

in response to a velocity of the position obtaining device that is being moved by the driver being equal to or less than a predetermined velocity, derive a first attitude angle with a first likelihood as an attitude angle of the position obtaining device, the first likelihood being a reliability indicator estimated by using a first light source that has a known position and does not perform light communication;

in response to a predetermined number of second light sources or more that perform the light communication being captured in an image obtained by a second camera, derive a three-dimensional position of the position obtaining device and a second attitude angle with a second likelihood lower than the first likelihood as the attitude angle of the position obtaining device, the second likelihood being a reliability indicator estimated by using the second light sources;

determine an overall likelihood of the attitude angle and the three-dimensional position of the position obtaining device estimated based on a first derived result of the first attitude angle and a second derived result of the three-dimensional position and the second attitude angle; and control the velocity of the position obtaining device, which is being moved by the driver, in accordance with the determined overall likelihood of the attitude angle and the three-dimensional position of the position obtaining device.

* * * * *